United States Patent [19]

Hoinski

[11] 4,090,122
[45] May 16, 1978

[54] DUAL BATTERY CHARGER WITH LOGIC MEANS

[75] Inventor: Walter W. Hoinski, Norristown, Pa.

[73] Assignee: Power Systems Development Corp., Wilmington, Del.

[21] Appl. No.: 776,276

[22] Filed: Mar. 10, 1977

[51] Int. Cl.² ............................................... H02J 7/14
[52] U.S. Cl. ......................................... 320/6; 320/15; 320/39; 322/94
[58] Field of Search .............................. 320/2, 5, 6–8, 320/11, 39, 15, 16; 322/89, 90, 94

[56] References Cited

U.S. PATENT DOCUMENTS

| | | | |
|---|---|---|---|
| 3,949,289 | 4/1976 | Day | 320/15 X |
| 4,041,363 | 8/1977 | Scheidler | 320/15 |
| 4,044,293 | 8/1977 | Follmer | 320/15 |
| 4,047,088 | 9/1977 | Himmler | 320/6 |

Primary Examiner—Robert J. Hickey
Attorney, Agent, or Firm—Paul & Paul

[57] ABSTRACT

A high capacity storage battery is mounted in a vehicle, and is selectively charged by the alternator thereof to afford a power source for remote utilization devices. Voltages of the standard automobile battery and the high capacity battery are monitored, and are charged by the alternator in accordance with a fixed priority. When the automobile battery is less than fully charged, it is charged by the alternator irrespective of the voltage at the high capacity battery. When the automobile battery is full, the high capacity storage battery is charged by the alternator until it is fully charged. Thereafter, the alternator is decoupled from both such batteries.

3 Claims, 2 Drawing Figures

DUAL BATTERY CHARGER WITH LOGIC MEANS

BACKGROUND OF THE INVENTION

This invention relates to electric power systems, and more particularly to electric power systems which utilize the surplus capacity of vehicle electrical systems to provide charging for a high capacity storage battery.

Conventionally, automobile and the like vehicles involve an electrical system utilizing an automotive battery (typically 12 volts but sometimes having other capacities) and an alternator. The battery is utilized to energize the starter, as well as to drive automotive accessories when the engine is inoperative. The engine, in operation, drives an alternator which provides electrical power not only to fire the engine and operate the automotive electrical system, but also to provide charge for the automotive battery. During a substantial amount of operational time, however, the automotive battery is fully charged, and the alternator possesses unused reserved capacity.

It is an object of the present invention to provide apparatus which successfully utilizes presently unused reserve capacity in automotive electrical systems, and more particularly to do so by providing apparatus, carried by the vehicle, which consumes such reserve and stores it for subsequent useage by utilization devices remote from the vehicle.

SUMMARY OF THE INVENTION

In accordance with the present invention, an additional high capacity storage battery is carried by the vehicle, and is logically interconnected with the automotive electrical system whereby it is charged by the alternator during such times as it is capable of taking charge, so long as that charge is not required by the standard automotive battery.

In an illustrative embodiment, the alternator output voltage is converted from AC to DC, and a resistive divider provides reference voltages corresponding respectively to full charges at the automotive battery and the high capacity battery. The auto battery is coupled to the alternator output for charging when its voltage is less than the corresponding reference. Thereafter, the alternator is coupled to charge the high capacity storage battery until that battery is fully charged, as represented by a comparison with its corresponding reference. When both batteries are fully charged, the alternator is decoupled from both.

DETAILED DESCRIPTION

Figure 1:
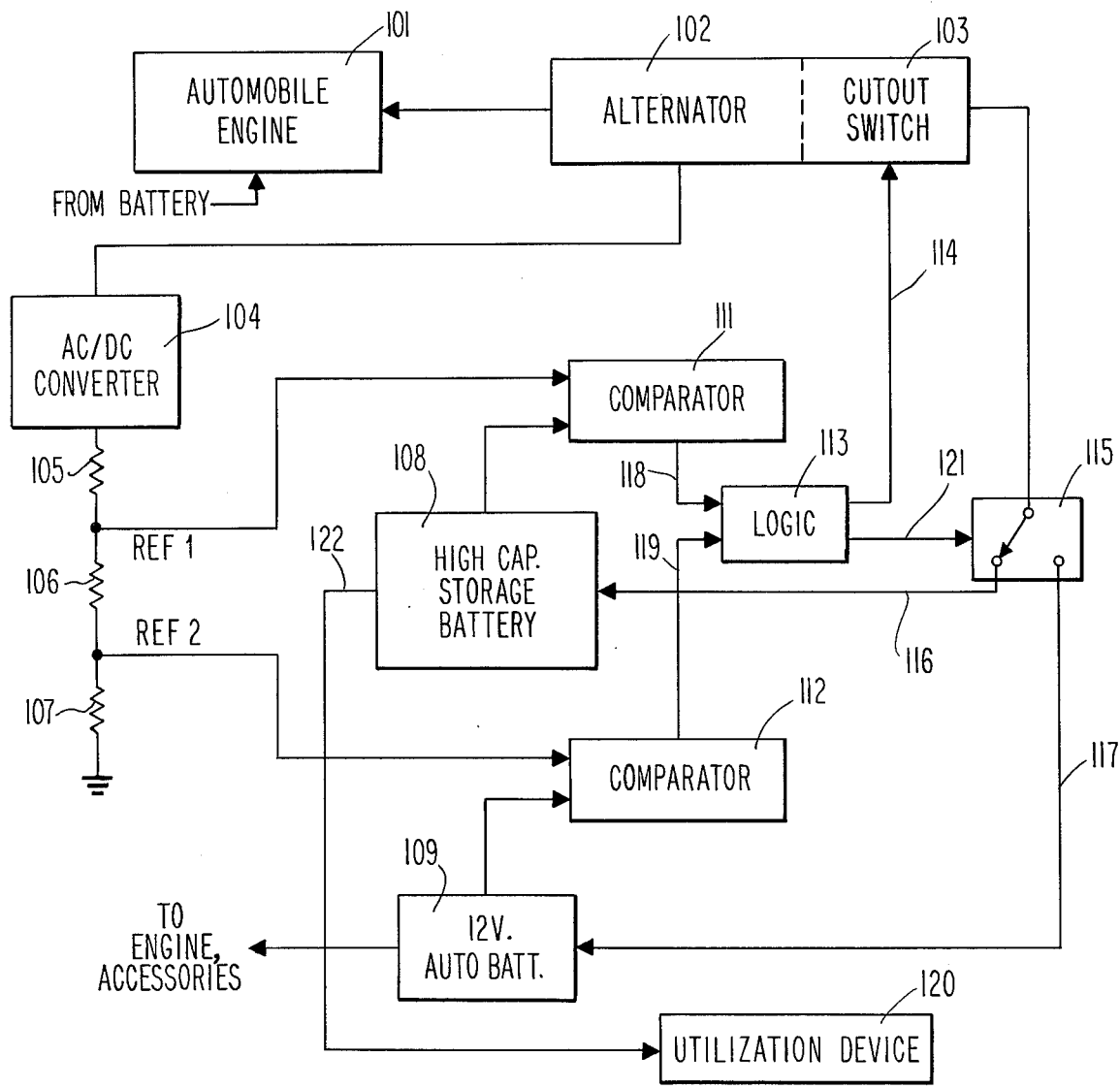
FIG. 1 shows an illustrative embodiment of the present invention in block diagrammatic form.

In FIG. 1, an automotive engine 101 is schematically shown to be coupled to an alternator 102. It is understood that the engine 101 mechanically drives alternator 102 in conventional fashion, and alternator 102 provides electrical power in conventional fashion to the engine. The engine 101 also is coupled to a standard automotive battery 109, shown as a 12 volt battery. It is understood that the principles of the present invention are not limited to such configurations, but apply generally to vehicles employing electrical systems having altenators and batteries.

Alternator 102 is shown to include a cutout switch 103. Switch 103 represents conventional apparatus whereby the alternator may be coupled or decoupled, as desired, to provide charge to the automotive battery 109. In the embodiment shown in FIG. 1, the cutout switch is instead coupled to yet another switch 115, which depending on its position at terminals 116 and 117, couples the alternator output either to the 12 volt battery 109 or a high capacity storage battery 108. The state of the cutout switch 103, and also that of switching device 115, is controlled by a logic network 113.

Logic network 113 establishes a priority for interconnection of the alternator output to batteries 108 and 109. Specifically, preference is given to charging the 12 volt battery 109 to a full charge, and thereafter charging the high capacity battery 108 to its full charge. When either of batteries 108 and 109 is being charged by alternator 102, logic 113 maintains cutout switch 103 in the closed position, and determines which battery 108 or 109 is to receive the charge by suitable operation of switching device 115. Logic device 113 functions in accordance with this priority as follows.

The output waveform of alternator 102 is shown coupled to an AC to DC converter 104. It is understood that device 104 may be a discrete device designed for the purpose, or alternatively may include the output charging diodes conventionally associated with alternators, which rectify the three phrase alternator AC output to a DC waveform. In either event, a DC voltage is provided to a voltge divider including resistors 105, 106, and 107. The division points of the divider afford respective reference voltages designated in the drawing "REF 1" and "REF 2".

REF 1 represents the voltage of the high capacity storage battery 108 when it is fully charged. REF 2 corresponds to the voltage of the automotive battery 109 when it is fully charged; for the embodiment shown in FIG. 1, REF 2 will be 12 volts.

REF 1 is coupled to a first input of a comparator 111, the other input of which receives the output terminal voltage of the high capacity storage battery 108. Comparator 111 provides an output signal at terminal 118 which is a logical 0 if the voltage of high capacity storage battery 108 is less than REF 1, and a logical 1 if the output voltage of high capacity storage battery 108 is equal to or greater than REF 1.

REF 2 is coupled to one input of an identical comparator 112, the other input of which receives the output voltage of the 12 volt automotive battery 109. Comparator 112 has its output terminal 119 in a logical 0 condition if the voltage of battery 109 is less than REF 2, and at logical 1 if the voltage of automotive battery 109 is equal to or greater than REF 2.

The logical signals at 118 and 119 from comparators 111 and 112, respectively, are coupled to logic network 113 for control of switches 103 and 115. If both of terminals 118 and 119 carry logical 1 signals (i.e., both batteries 108 and 109 are fully charged), a logical 1 signal is coupled via 114 to open the normally closed cutout switch 103. Under such circumstance, the state of switching device 115 is irrelevant. If either of terminals 118 and 119 carry logical 0's, indicating that one or the other of batteries 108 and 109 is less than fully charged, a logical 0 will be produced at 114 by logic network 113, and cutout switch 103 will remain closed. Under such circumstances, the following priority is followed.

If a logical 0 is produced at terminal 119 from comparator 112, logic circuit 113 produces a signal at output terminal 121, whereby switching device 115 is connected to terminal 117, thereby coupling the alternator output to charge the automotive battery 109. This is so regardless of the condition of output terminal 118 of comparator 111.

If, however, a logical 1 is presented at 119 by comparator 112, the position of switch 115 will be regulated by the logical state of output terminal 118 of comparator 111. That is, when terminal 119 is a logical 1, a logical 0 at terminal 118, indicating the need for further charging at high capacity battery 108, will cause logic 113 to produce a signal at output terminal 121, whereby switching device 115 is closed to terminal 116, thereby coupling the output of alternator 102 to the high capacity storage battery 108.

Figure 2:
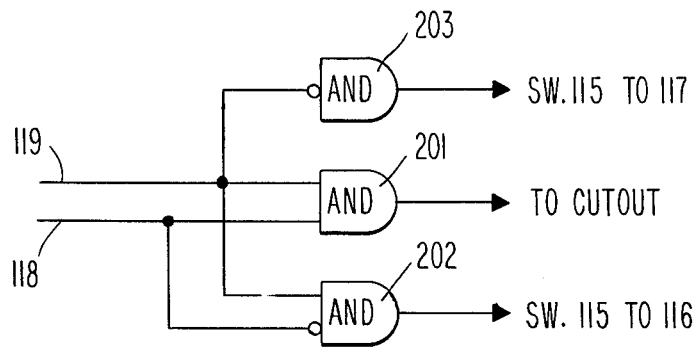
FIG. 2 shows a schematic representation of a portion of the embodiment of FIG. 1.

FIG. 2 shows an illustrative embodiment for logic network 113 utilizing conventional gates. Specifically, AND gate 201 operates cutout switch 103 as set forth hereinbefore in response to the logical signals at 118 and 119. A logical 0 will be conveyed to the cutout switch 103 except when both terminals 118 and 119 carry logical 1's. If both 118 and 119 carry logical 1's, gate 201 transmits a logical 1 to open switch 103.

Gates 202 and 203 establish the positions of switching device 115 and 116 or 117 in complementary fashion, always giving priority to the need for charge at the automotive battery, and alternatively giving priority to the high capacity storage battery. Hence, a logical 0 at 119 will energize gate 203 and inhibit gate 202, and battery 109 will receive charge from the alternator 102. A logical 1 at 119 will inhibit gate 203, and enable gate 202 to be operated by terminal 118. A logical 0 at 119 will then energize gate 202, thereby closing switch 115 to terminal 116, and to charge battery 108. In such an arrangement, switch 115 may be embodied by commercially available relay or electronic switching arrangements, operating between 116 and 117 in respective response to logical 1's from gates 202 and 203.

The high capacity storage battery 108 functions as a reserve source of power for a utilization device 120. It is contemplated that an output cable from the high capacity device 108, schematically shown as 122 in the drawing, may be embodied by a reel-type cable or the like, furnishing the facility to plug the battery 108 into a spatially disparate utilization device 120. For example, when the vehicle is parked near a building, the line 122 may extend to an appropriate receptical at the building, and high capacity storage battery 108 may be utilized to furnish electrical power to the building itself, or select systems therein (e.g., a house wiring system or tools utilized at a construction site). Although not expressly shown, it is to be understood that the utilization device 120 may also include, as desired, appropriate transformers, control devices, DC to AC converters, and the like.

The foregoing has set forth an illustrative embodiment of the present invention, but it is to be understood that numerous alternative embodiments will occur to those of ordinary skill in the art without departure from the spirit or scope of the present invention. For example, the scheme set forth for interconnecting the alternator 102 with batteries 108 and 109 may be different from that set forth without exclusion from the purview of the principles of the present invention. Switching devices 103 and 115 may be integral with or discrete from conventional alternator circuitry, as may be convertor 104. The logical scheme set forth may be altered considerably in accordance with knowledge of those of ordinary skill in the art.

I claim:

1. An electric power system associated with a motor vehicle comprising:
   (a) an engine associated with the vehicle;
   (b) an alternator driven by said engine to generate electricity;
   (c) a first battery for operating components of said vehicle including said engine;
   CHARACTERIZED BY
   (d) a high capacity battery carried by said vehicle;
   (e) first means for evaluating the charge level of said first battery;
   (f) second means for evaluating the charge level of said high capacity battery; and
   (g) logic means for distributing the electricity generated by said alternator in accordance with the following priority:
      (i) said alternator being coupled to charge said first battery whenever said first battery is less than fully charged, irrespective of the charge level of said high capacity battery,
      (ii) said alternator being coupled to charge said high capacity battery whenever said high capacity battery is less than fully charged, if said first battery is fully charged, and
      (iii) said alternator being decoupled from both said batteries when both said batteries are fully charged.

2. A system as described in claim 1 and further including means for coupling said high capacity battery to drive a utilization device.

3. A system as described in claim 2 and further including means, responsive to said alternator, for developing first and second reference voltages for utilization by said first and second means, respectively, for comparison with the voltages of said first battery and said high capacity battery, respectively.

* * * * *